US012645405B2

(12) United States Patent
Yano et al.

(10) Patent No.: US 12,645,405 B2
(45) Date of Patent: Jun. 2, 2026

(54) SEMICONDUCTOR DEVICE AND OPERATING METHOD THEREOF

(71) Applicant: Winbond Electronics Corp., Taichung (TW)

(72) Inventors: Masaru Yano, Tokyo (JP); Takehiro Kaminaga, Tokyo (JP)

(73) Assignee: Winbond Electronics Corp., Taichung City (TW)

( * ) Notice: Subject to any disclaimer, the term of this patent is extended or adjusted under 35 U.S.C. 154(b) by 0 days.

(21) Appl. No.: 18/677,892

(22) Filed: May 30, 2024

(65) Prior Publication Data

US 2024/0419369 A1　　Dec. 19, 2024

(30) Foreign Application Priority Data

Jun. 14, 2023　(JP) ................................. 2023-097574

(51) Int. Cl.
*G06F 3/06*　　　　　(2006.01)

(52) U.S. Cl.
CPC .......... *G06F 3/0688* (2013.01); *G06F 3/0607* (2013.01); *G06F 3/0659* (2013.01)

(58) Field of Classification Search
CPC .... G06F 3/0607; G06F 3/0659; G06F 3/0688; G06F 1/00; G06F 16/00; G06F 40/00; G06F 2119/00
See application file for complete search history.

(56) References Cited

U.S. PATENT DOCUMENTS

| | | | |
|---|---|---|---|
| 7,519,754 B2 | 4/2009 | Wang et al. | |
| 8,399,973 B2 | 3/2013 | Oh et al. | |

| | | | |
|---|---|---|---|
| 2008/0133824 A1* | 6/2008 | Kim .................... | G06F 12/0246 |
| | | | 711/E12.008 |
| 2010/0312952 A1 | 12/2010 | Maheshwari et al. | |
| 2012/0185639 A1* | 7/2012 | Hsu ......................... | G06F 9/441 |
| | | | 711/E12.008 |
| 2014/0269065 A1* | 9/2014 | Jigour ................. | G06F 11/1068 |
| | | | 365/185.17 |
| 2015/0248921 A1 | 9/2015 | Chen et al. | |
| 2019/0056989 A1* | 2/2019 | Srinivasan ............. | G11C 16/28 |

FOREIGN PATENT DOCUMENTS

| | | |
|---|---|---|
| CN | 107851455 | 3/2018 |
| JP | H0793980 | 4/1995 |
| JP | 2007183961 | 7/2007 |
| JP | 2012532273 | 12/2012 |
| JP | 6232109 | 11/2017 |
| KR | 20070070122 | 7/2007 |
| TW | I631564 | 8/2018 |

OTHER PUBLICATIONS

"Office Action of Korea Counterpart Application", issued on Mar. 21, 2025, p. 1-p. 7.

* cited by examiner

*Primary Examiner* — Yong J Choe

(74) *Attorney, Agent, or Firm* — JCIPRNET

(57) ABSTRACT

An operating method of a semiconductor device including a NOR type flash memory and a NAND type flash memory is improved. A flash memory includes a NOR type flash memory, a NAND type flash memory, a controller, and an internal bus connecting the NOR type flash memory and the NAND type flash memory to the controller. The controller controls the NOR type flash memory, or the NOR type flash memory and the NAND type flash memory based on a command received from an outside.

17 Claims, 8 Drawing Sheets

(A)

(B)

(A)

(B)

| NOR_Page0～Page15 (2 × 2KB) | NAND_Page2～Page63 (62 × 2KB) |
|---|---|
| 40us | 40us × 62=2480us |

About 2.6 ms (A)

SEMICONDUCTOR DEVICE AND OPERATING METHOD THEREOF

CROSS-REFERENCE TO RELATED APPLICATION

This application claims the priority benefit of Japan application serial no. 2023-097574, filed on Jun. 14, 2023. The entirety of the above-mentioned patent application is hereby incorporated by reference herein and made a part of this specification.

BACKGROUND OF THE INVENTION

Field of the Invention

The invention relates to a semiconductor device including a NOR type flash memory and a NAND type flash memory.

Description of Related Art

Among recent flash memories, an increasing number of memories are equipped with a serial interface enabling high-speed input/output of data with a small number of terminals. For the serial interface, for example, there is a standard serial peripheral interface (SPI) requiring an 8-bit command code and a 24-bit address.

NOR type flash memory is equipped with a function to continuously register/output data in so-called burst mode or page mode. For example, during a read out operation, as shown in (A) of FIG. 1, when the chip select signal/CS becomes low active, when the read out command and the address are input from the external terminal in synchronization with the serial clock signal, the column address is automatically incremented, and the read out data is sequentially synchronized with the serial clock signal and output from the external terminal. In the programming operation, when the programming command and address are input from the external terminal, the column address is automatically incremented, and the programming data input from the external terminal is programmed into the storage cell synchronously with the serial clock signal. This type of continuous read out or continuous writing is terminated by changing the chip selection signal/CS to high level (Patent Document 1: Japanese Patent No. 6232109).

Moreover, among NAND type flash memories, in order to achieve compatibility with NOR type serial flash memories, memories equipped with a serial interface have also been put into practical use. In the case of continuous read out in NAND type flash memory, when the continuous read out command and address are input from the external terminal, the data read out from the page of the storage cell array is held in the page buffer/read out circuit, the column address is automatically incremented, and the data held in the page buffer/read out circuit is output from the external terminal synchronously with the serial clock signal.

(B) of FIG. 1 shows a timing chart of a continuous read out operation of a NAND type flash memory. The chip select signal CS becomes low active, and the 8-bit page data read out command (such as "13 h") and the 16-bit page address PA (used to select the row address of the block and the page) are input, and after a latency equal to the time for data from a selected page of the storage cell array to be transferred to the page buffer/read out circuit, the 8-bit read out command and the 16-bit address (this is the empty dummy address) for continuous read out are input. The NAND type flash memory enters a continuous read out mode via the input of a series of commands and addresses. The input page address PA is automatically incremented, and the read out page data is sequentially synchronized with the serial clock and serially output to the outside. During the period when the chip select signal CS is low level, that is, during the period in the continuous read out mode, there is no need to input the page data read out command and the page address PA to the flash memory.

The NOR type flash memory may perform high-speed read out via random access and has excellent durability or retention characteristics, and therefore is suitable for saving the boot code or the firmware for system startup. Moreover, the programming time per byte of NOR type flash memory is dozens of times longer than that of NAND type flash memory, and the power consumption during programming is also greater, so the NOR type flash memory may not be considered to have excellent storage.

Therefore, a stacked type flash memory in which a NOR type flash memory chip (or die) and a NAND type flash memory chip (or die) are stacked has been put into practical use. When stacked type flash memory is used, as shown in (A) of FIG. 1 and (B) of FIG. 1, the host device enables either the NOR type flash memory or the NAND type flash memory according to the chip select signal CS. For example, large-capacity data is programmed into the NAND type flash memory, and small-capacity data that needs to be read out at high speed is programmed into the NOR type flash memory.

However, the existing operating method of stacked type flash memory requires selecting each of NOR type flash memory and NAND type flash memory respectively for operation. The processing at the host device side has become complicated, and improvements in the operating method of the stacked type flash memory are needed.

SUMMARY OF THE INVENTION

An object of the invention is to solve such existing issues and improve the operation of a semiconductor device by merging NAND type flash memory without reducing the performance of NOR type flash memory.

A semiconductor device of the invention includes: an input/output circuit; a NOR type flash memory and a NAND type flash memory connected to the input/output circuit via an internal bus; and a controller controlling an operation of the NOR type flash memory and the NAND type flash memory according to a command received from the input/output circuit.

In an operating method of a semiconductor device including a NOR type flash memory and a NAND type flash memory of the invention, a controller of the NOR type flash memory controls an operation of the NOR type flash memory and the NAND type flash memory based on a command received via an input/output circuit.

According to the invention, since the operation of the NOR type flash memory and the NAND type flash memory is controlled based on a command received from the input/output circuit, the NOR type flash memory and the NAND type flash memory may be made to cooperate, thereby reducing the processing of the host device and improving the convenience of the semiconductor device.

BRIEF DESCRIPTION OF THE DRAWINGS (A) of FIG. 1 is a timing chart of a continuous read out operation of a NOR type flash memory, and (B) of FIG. 1 is a timing chart of a continuous read out operation of a NAND type flash memory.

DESCRIPTION OF THE EMBODIMENTS

A semiconductor device of the invention includes at least one NOR type flash memory and at least one NAND type flash memory as different types of flash memories. The semiconductor device includes a package structure in which a NOR type flash memory chip and a NAND type flash memory chip are laminated.

Figure 2:
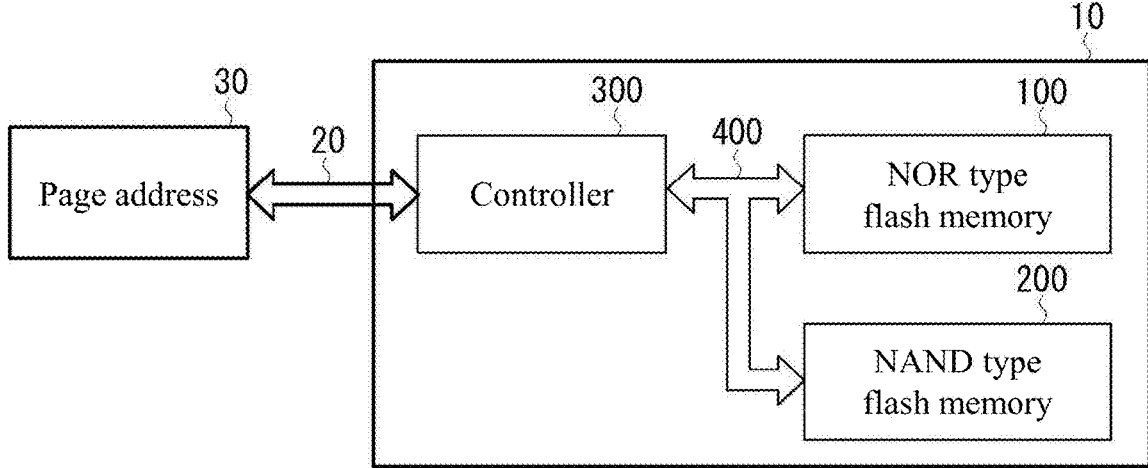
FIG. 2 is a block diagram of the overall structure of a stacked type flash memory of an embodiment of the invention.

As shown in FIG. 2, a stacked type flash memory 10 of an embodiment of the invention is connected to a host device 30 via an external bus 20. The stacked type flash memory 10 includes a NOR type flash memory 100, a NAND type flash memory 200, a controller 300, and an internal bus 400. The NOR type flash memory 100, the NAND type flash memory 200, and the controller 300 are connected to each other via the internal bus 400, and data may be transferred therebetween via the internal bus 400. The external bus 20 is not particularly limited, and may be SPI, quad SPI, or octal SPI, for example. When the external bus 20 corresponds to SPI, the internal bus 400 also corresponds to SPI.

The stacked type flash memory 10 includes, but is not limited to, a laminate of a chip (or die) on which the NOR type flash memory 100 and the controller 300 are formed and a chip (or die) on which the NAND type flash memory 200 is formed. The stacked chips are electrically connected to each other. For example, a conductive pad formed on the surface of one of the chips is connected to a conductive pad formed on the surface of the other chip directly or indirectly via a conductive member. Alternatively, the electrical connection between the chips may also be achieved via a conductive member penetrating between the stacked chips.

The stacked type flash memory 10 includes a package (for example, resin sealing or ceramic sealing, etc.) accommodating the laminated chips. The package includes an external terminal providing an electrical interface between the internal chip and the outside. The external terminal includes, for example, a ball grid array (BGA) or a land grid array (LGA), etc. formed at the back of the package. The external terminal may include a data entry/output terminal, an address terminal, a clock terminal, a control terminal, a power terminal, etc.

The host device 30 outputs a command, an address, a clock signal, a control signal, etc. to the stacked type flash memory 10 via the external bus 20 to make the stacked type flash memory 10 perform a desired operation. The command used by the host device 30 is a command according to the specifications of the NOR type flash memory. The host device 30 uses the stacked type flash memory 10 as a NOR type flash memory and issues a programming command, a read out command, and an erase command for the NOR type flash memory, and the NAND type flash memory 200 is operated in a place invisible to the user.

Figure 3:
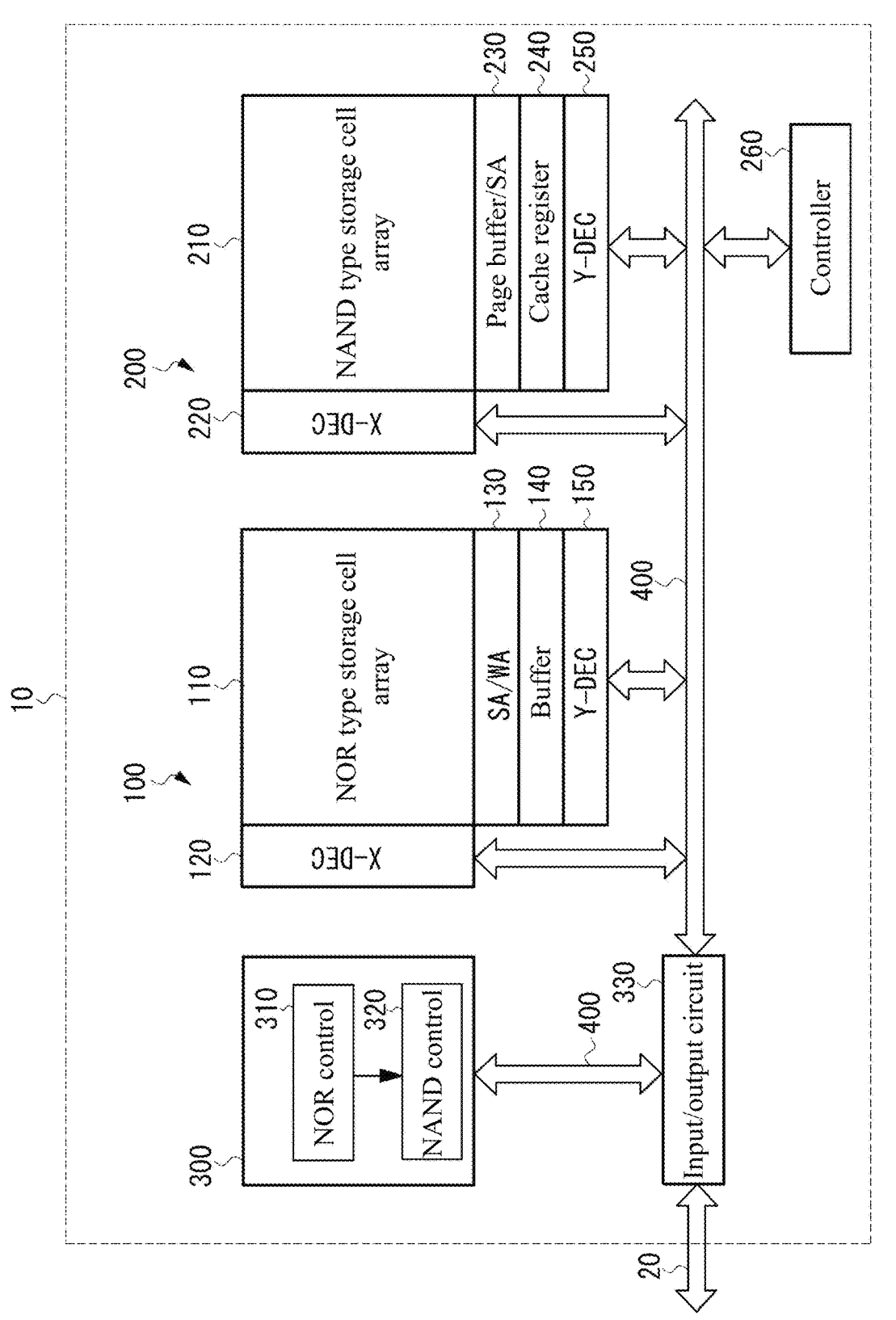
FIG. 3 is an internal structural diagram of a stacked type flash memory of an embodiment of the invention.

FIG. 3 is a diagram showing the internal structure of the stacked type flash memory 10 of the present embodiment. The NOR type flash memory 100 is composed of the following: a NOR type storage cell array 110, in which a plurality of storage cells are connected in parallel between bit lines and source lines; a row address decoder (X-decoder, X-DEC) 120 selecting/driving word lines based on row address; an SA/WA (sense amplifier/write amplifier) 130 reading out data from a storage cell or writing data in a storage cell; a buffer 140 holding one page of data received from the input/output circuit 330 during the programming operation, and transmitting the data selected based on the column address to the SA/WA 130; a column address decoder (Y-decoder, Y-DEC) 150 selecting bit lines based on column address, etc.

The NOR type flash memory 100 is equipped with a function of continuously inputting/outputting data, and may read out or program data in units of pages. The unit of the page is not particularly limited and may be set arbitrarily, for example, 256 bytes. The buffer 140 of the NOR type flash memory 100 may store one page of data. During the programming operation, the buffer 140 stores data received via the input/output circuit 330. The data held in the buffer 140 is selected based on the column address of the Y-DEC 150. The selected data is transferred to the SA/WA 130. The SA/WA 130 programs to the selected storage cell of the selected bit based on the transferred data.

The NAND type flash memory 200 includes the following: a NAND type storage cell array 210 connected in series so that a plurality of storage cells arranged in a matrix form a NAND string; an X-DEC 220 selecting/driving blocks and word lines based on row address; a page buffer/SA (sense amplifier) 230 holding the data read out from the selected page of the storage cell array 210, or holding the data to be programmed in the selected page; a cache register 240 transferring data (for example, in ½ page units) with the page buffer/SA 230; a Y-DEC 250 performing selection of bit line based on column address, etc.; a controller 260 connected to the internal bus 400. In addition, although not shown here, the stacked type flash memory 10 may include a voltage generation circuit or a clock generation circuit, etc. generating voltages, etc. needed for reading out, programming, erasing, etc. of data.

The controller 300 includes a NOR control 310 and a NAND control 320. The controller 300 is connected to the input/output circuit 330 via the internal bus 400. The input/output circuit 330 is connected to the host device 30 via the external bus 20 and receives a command, an address, data, etc. from the host device 30. In addition, the input/output circuit 330 is connected to the NOR type flash memory 100 and the NAND type flash memory 200 via the internal bus 400.

The input/output circuit 330 corresponds to SPI, more preferably corresponds to quad SPI or octal SPI, and the data transmission in the external bus 20 and the internal bus 400 is synchronized with the clock signal.

The input/output circuit 330 includes an input/output terminal, a clock terminal, etc., and performs data input/output in synchronization with the rising edge and/or falling edge of the clock signal provided to the clock terminal. During the programming operation, the data obtained via the input/output circuit 330 is provided to the NOR type flash memory 100 or the NAND type flash memory 200 via the internal bus 400, and programming of the NOR type flash memory 100 or the NAND type flash memory 200 may be implemented.

The controller 300 controls the operation of the NOR type flash memory 100 or the NAND type flash memory 200 based on the command received from the host device 30, and further controls the data transmission of the internal bus 400. The NOR control 310 controls the operation of the NOR type flash memory 100, and the NAND control 320 controls the operation of the NAND type flash memory 200. More specifically, the NOR control 310 controls an operation such as reading out, programming, and erasing of the NOR type flash memory 100 based on a command received via the input/output circuit 330, or the NAND control 320 generates an internal command or an internal address for controlling the NAND type flash memory 200 based on a specific command received from the input/output circuit 330.

When the specific command from the host device 30 corresponds to a command including programming of the NAND type flash memory 200, the NOR control 310 makes the NAND control 320 generate an internal command and an internal address for programming the NAND type flash memory 200, and the generated internal command and internal address are provided to the controller 260 of the NAND type flash memory 200 via the input/output circuit 330 and the internal bus 400. The NAND control 320 refers to a look-up-table (LUT) to generate an internal address corresponding to the address received from the host device 30. The controller 260 of the NAND type flash memory 200 responds to the received internal command and programs the data received via the input/output circuit 330 and the internal bus 400 into the selected page of the NAND type memory array 210.

Moreover, when the specific command corresponds to a command including reading out from the NAND type flash memory 200, the NOR control 310 makes the NAND control 320 generate an internal command and an internal address for reading out the NAND type flash memory 200, and the generated internal command and internal address are provided to the controller 260 of the NAND type flash memory 200 via the input/output circuit 330 and the internal bus 400. The controller 260 of the NAND type flash memory 200 outputs the data read out from the selected page of the NAND type memory array 210 to the external bus 20 via the internal bus 400 and the input/output circuit 330 in response to the received internal command.

When the stacked type flash memory 10 receives a command according to the NOR type flash memory from the host device 30, the NOR control 310 controls the NOR type flash memory 100 and/or controls the NAND type flash memory 200 via the NAND control 320 in response to the command. For example, when the host device 30 programs data such as boot code or firmware into the stacked type flash memory 10, the host device 30 issues a specific command (such as a continuous write command or a page mode write command, etc.), address, and data.

When receiving a specific command from the host device 30 via the input/output circuit 330, the NOR control 310 controls the program of the NOR type flash memory 100, and the NAND control 320 issues an internal command and an internal address for programming the NAND type flash memory 200. The NOR type flash memory 100 writes data received from the input/output circuit 330 into the NOR type array 110, and the NAND type flash memory 200 writes the data received from the input/output circuit 330 into the NAND type array 210 in parallel or separately with the writing of the NOR type flash memory 100.

When reading out data such as boot data or firmware from the stacked type flash memory 10, the host device 30 issues a specific command (for example, a continuous read out command or a page mode read out command, etc.) and an address. When a specific command is received from the host device 30 via the input/output circuit 330, the NOR control 310 controls the reading out of the NOR type flash memory, and an internal command and an internal address for reading out the NAND type flash memory 200 are issued from the NAND control 320. The NOR type flash memory 100 outputs the data read out from the NOR type array 110 via the input/output circuit 330, and the NAND type flash memory 200 outputs the data after reading out from the NOR type flash memory or separately from the NAND type array 210 via the input/output circuit 330.

Figure 4:
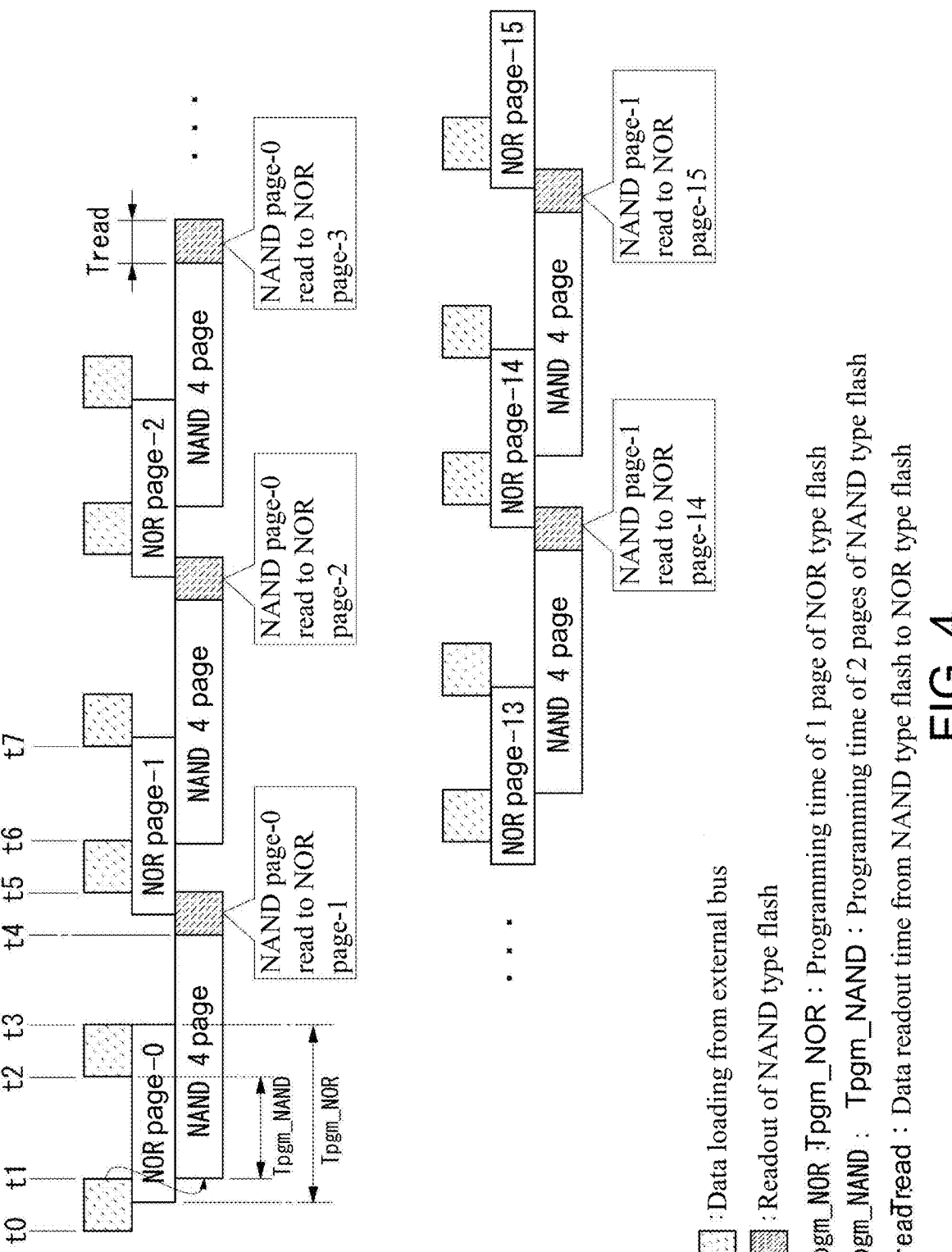
FIG. 4 is a timing chart when dual-mode writing/reading out is performed on the stacked type flash memory of an embodiment of the invention.
Figure 5:
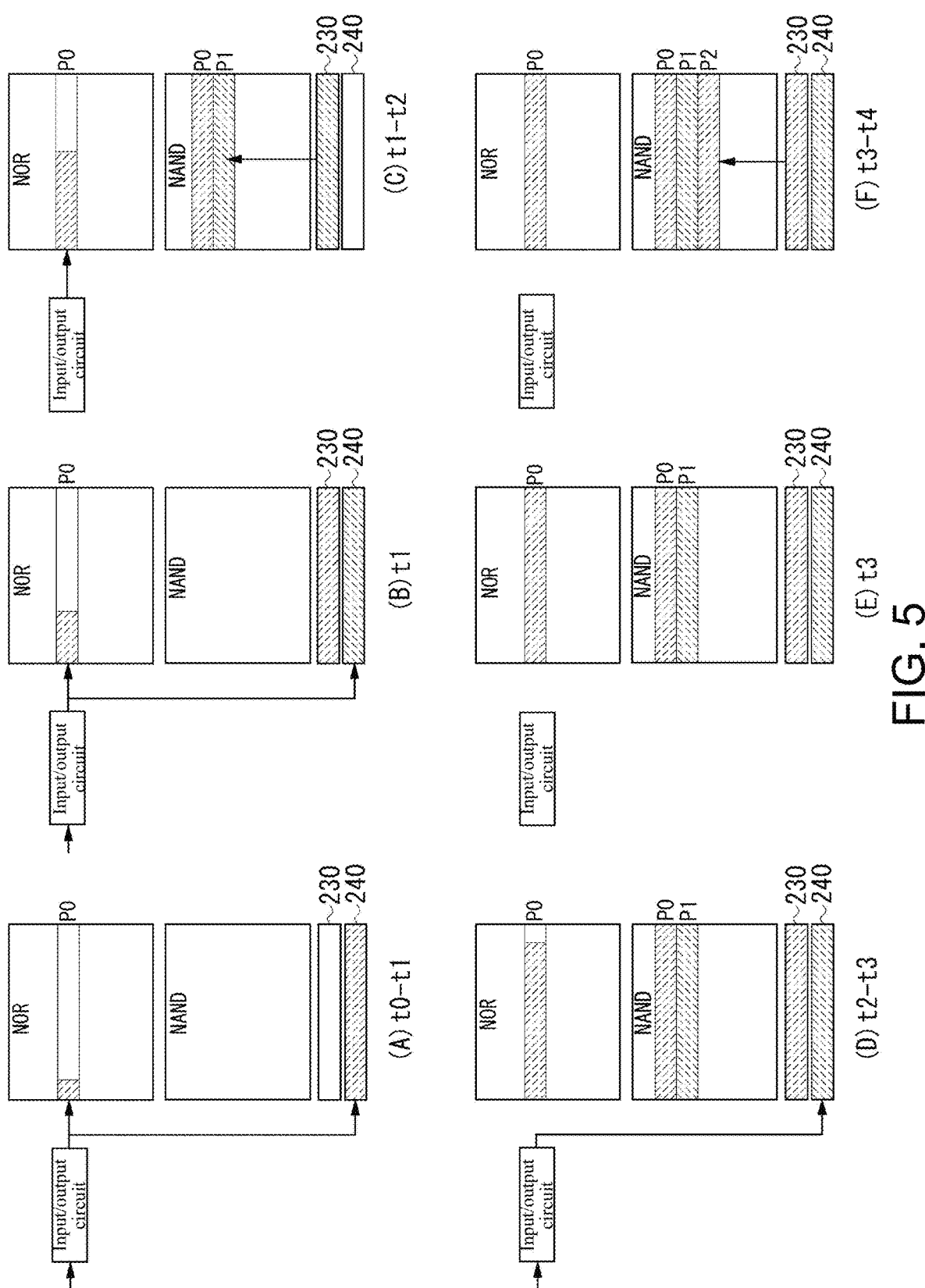
FIG. 5 and FIG. 6 are diagrams of a programming operation in the stacked type flash memory of the present embodiment.
Figure 6:
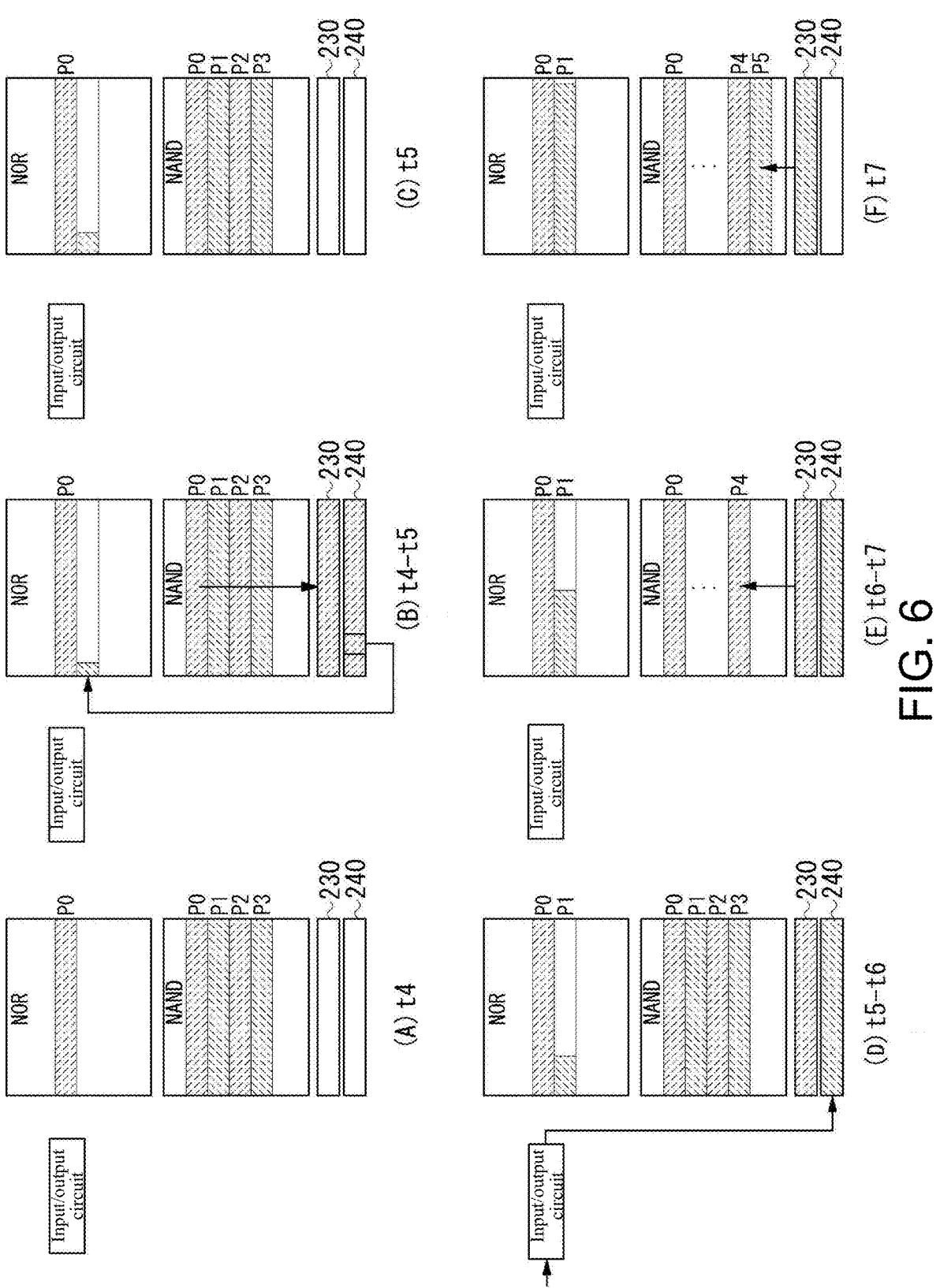

Next, an example of continuously programming data into the stacked type flash memory 10 of the present embodiment is described. FIG. 4 is a timing chart of programming data, and FIG. 5 and FIG. 6 illustrate the operation transition between NOR type flash memory and NAND type flash memory. Tpgm_NOR is the programming time of one page of the NOR type flash memory, Tpgm_NAND is the programming time of two pages of the NAND type flash memory, and Tread is the data read out time from the NAND type flash memory to the NOR type flash memory.

It is assumed that one page of the NOR type flash memory 100 is 256 bytes, and one page of the NAND type flash memory 200 is 2 K bytes. That is, one page of data in the NAND type flash memory 200 is equivalent to eight pages of data in the NOR type flash memory 100.

During the programming operation, the NOR type flash memory 100 saves 256 bytes of data in the buffer 140. The data read out from the buffer 140 is programmed into the selected storage cell of the selected page in units of bits, units of bytes, or units of characters. Moreover, the NAND type flash memory 200 stores 2 K bytes of data in the cache register 240 and the page buffer/SA 230 respectively. The data held in the page buffer/SA 230 is programmed into the selected page in units of pages. Therefore, the NAND type flash memory may perform high-speed programming, and the programming time per unit bit of the NOR type flash memory 100 is much longer than that of the NAND type flash memory 200.

Figure 1:
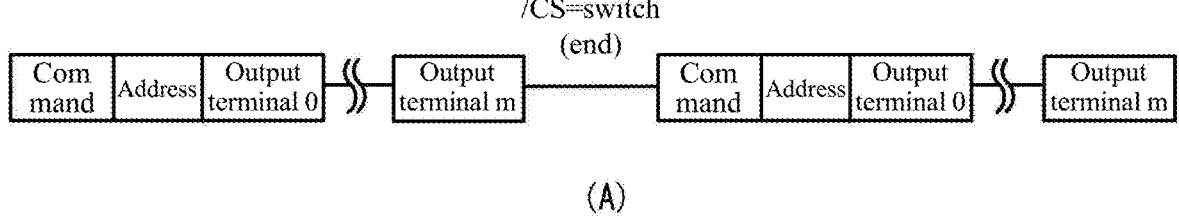
Figure 1:
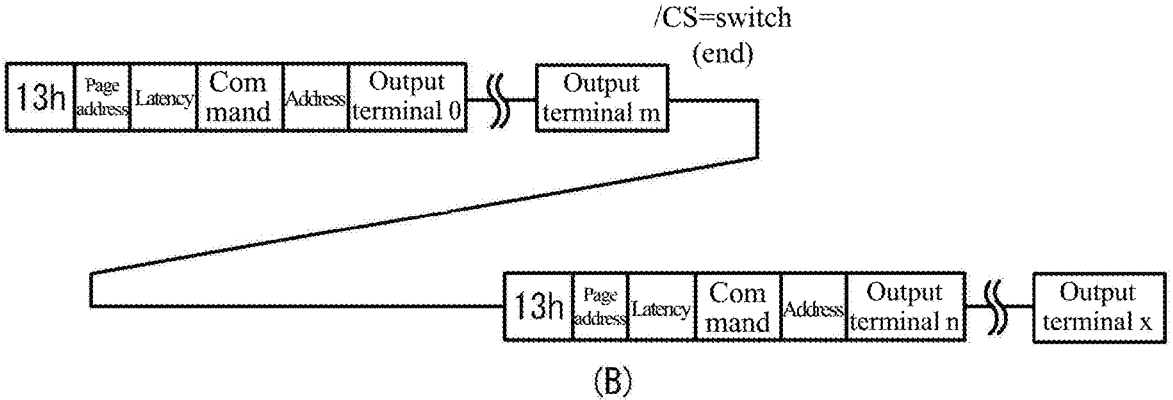

When receiving a command and an address from the host device 30 via the input/output circuit 330, the controller 300 continuously writes data to the NOR type flash memory 100 and the NAND type flash memory 200 in page mode. In continuous writing, for example, the first row address of the NOR type flash memory 100 is specified, and then the row address and the column address are automatically generated by a counter. The row address of the NAND type flash memory 200 is automatically generated by the NAND control 320 or the controller 260. To end the continuous writing, for example, the CS/signal is toggled in the same manner as before (see (A) of FIG. 1), or a command to end the continuous writing is input to the stacked type flash memory 10.

When a continuous writing operation is started, data is retrieved from the external bus 20 via the input/output circuit 330. During the period from time t0 to time t1 of FIG. 4, two pages of data of the NAND type flash memory 200 are retrieved from the input/output circuit 330. The retrieved data is sequentially stored in the buffer 140 of the NOR type flash memory 100 via the internal bus 400, and in parallel, is also sequentially stored in the cache register 240 of the NAND type flash memory 200. When the cache register 240 stores one page of data, the one page of data is transferred to the page buffer/SA 230 and the next page of data is loaded.

The data stored in the buffer 140 is transmitted to the SA/WA 130 in bit units or multi-bit units. The SA/WA 130 programs the received data into the selected storage cell (one bit or multiple bits) of the selected page P0. This situation is shown in (A) of FIG. 5. At time t1, as shown in (B) of FIG. 5, loading of two pages of data from the external bus 20 into the cache register 240 of the NAND type flash memory 200 is ended.

When the data loading from the external bus 20 is ended at time t1, the NAND type flash memory 200 programs two pages of stored data during the period from time t1 to time t2. This situation is shown in (C) of FIG. 5. The first one page of data held in the page buffer/SA 230 is programmed into the selected page P0 of the NAND type array. Then, the data held in the cache register 240 is transferred to the page buffer/SA 230, and the data is programmed into the select page P1. During the period of programming the NAND type flash memory 200, the page P0 is programmed in the NOR type flash memory 100.

During the period from time t2 to time t3, the next two pages of data are loaded into the NAND type flash memory 200. This situation is shown in (D) of FIG. 5. At time t3, when the data loading is ended, the programming of the page P0 in the NOR type flash memory 100 is ended. This situation is shown in (E) of FIG. 5.

During the period from time t3 to time t4, the NAND type flash memory 200 programs two pages of stored data. This situation is shown in (F) of FIG. 5. Data is programmed in the selected page P2 and the selected page P3 of the NAND type array 210. The situation when programming of the NAND type flash memory 200 is ended at time t4 is shown in (A) of FIG. 6.

When programming is ended just after time t4, in order to program page P1 of the NOR type flash memory 100 during the period from time t4 to time t5, the data of page P0 of the NAND type flash memory is read out, and the read out data is programmed into page P1 of the NOR type flash memory 100. This situation is shown in (B) of FIG. 6. The data of the selected page P0 of the NAND type memory array is read out to the page buffer/SA 230, and then the read out data is transferred to the cache register 240. The data of page P0 held in the cache register 240 includes eight pages of data from page P0 to page P7 of the NOR type flash memory 100. The controller 260 selects the 256-byte data of column address 257 to column address 512 of the cache register 240 via the Y-DEC 250 and outputs the 256-byte data to the internal bus 400. The NOR type flash memory 100 sequentially stores the 256-byte data received from the internal bus 400 in the buffer 140, and then transfers the selected data of the buffer 140 to the SA/WA 130 via the Y-DEC 150 to be programmed in the selected storage cell of page P1 of the NOR type memory array.

At time t5, the data transfer to the buffer 140 is ended, and the situation at this time is shown in (C) of FIG. 6. The data held in the page buffer/SA 230 and the cache register 240 of the NAND type flash memory 200 are reset to be ready for loading the next two pages of data.

During the period from time t5 to time t6, the next two pages of data are loaded from the external bus 20 into the NAND type flash memory 200. This situation is shown in (D) of FIG. 6. During this period, page P1 is programmed in the NOR type flash memory 100. During the period from time t6 to time t7, the NAND type flash memory 200 programs two pages of loaded data into page P4 and page P5. This situation is shown in (E) of FIG. 6. At time t7, the programming of page P5 in the NAND type flash memory 200 is ended, and at approximately the same timing, the programming of page P1 in the NOR type flash memory 100 is ended. This situation is shown in (F) of FIG. 6.

In this way, the data read out from the NAND type flash memory 200 is programmed after page P1 of the NOR type flash memory 100. FIG. 4 is a timing chart when two pages of data of page P0 and page P1 programmed in the NAND type flash memory 200 are programmed into the NOR type flash memory 100. The clock signal based on SPI is 100 MHz, and data is output synchronously with Data Terminal Ready (DTR) (rising edge and falling edge). When it is assumed that Tpgm_NOR=0.7 ms and Tread=400 us, in the stacked type flash memory 10 of the present embodiment, the time Ta needed to program 16 pages (NOR_Page0 to NOR_Page15) in the NOR type flash memory 100 is $$Ta\fallingdotseq(400\ us\times16)+0.7\ ms<8\ ms.$$

Moreover, in the existing stacked type flash memory, the time Tb needed to program 16 pages in the NOR type flash memory is $$Tb\fallingdotseq16\times0.7\ ms=11.2\ ms.$$

In this way, during the programming operation, the data is stored in the NAND type flash memory that may be programmed at high speed and used like a cache memory, thereby significantly shortening the time needed for programming the NOR type flash memory.

As shown in FIG. 6, if six pages of data, namely page P0 to page P5, programmed into the NAND type flash memory 200 are programmed into the NOR type flash memory 100, 48 pages of data are programmed in the NOR type flash memory 100. The greater the data size to be programmed in the NOR type flash memory 100 is, the greater the shortening of the time needed for programming may be.

In this way, according to the present embodiment, the NOR type flash memory and the NAND type flash memory are made to cooperate. During the programming operation, the data is loaded into the NOR type flash memory 100 and the NAND type flash memory 200, the data programmed in the NAND type flash memory 200 is read out from there, and the read out data is programmed into the NOR type flash memory 100. Therefore, compared with the case of programming the data into the NOR type flash memory alone, the programming time may be significantly shortened.

Next, the operation of continuously reading out data from the stacked type flash memory 10 of the present embodiment is described. Here, as shown in FIG. 4, the NOR type flash memory 100 stores NOR_Page0 to NOR_Page15 (1 page is 256 bytes, NOR_Page0 to NOR_Page15 correspond to the two pages of the NAND type flash memory, page P0 and page P1), and the NAND type flash memory 200 stores page P0 to page P63 (1 page is 2 K bytes). Page P0 to page P63 correspond to, for example, data of one block of the NAND type memory array, and the read out data is, for example, 1 Mb (128 K bytes) of boot data. For example, the controller 300 refers to the LUT to manage the addresses of NOR_Page0 to NOR_Page15 stored in the NOR type flash memory and the addresses of page P0 to page P63 stored in the NAND type flash memory.

Figure 7:
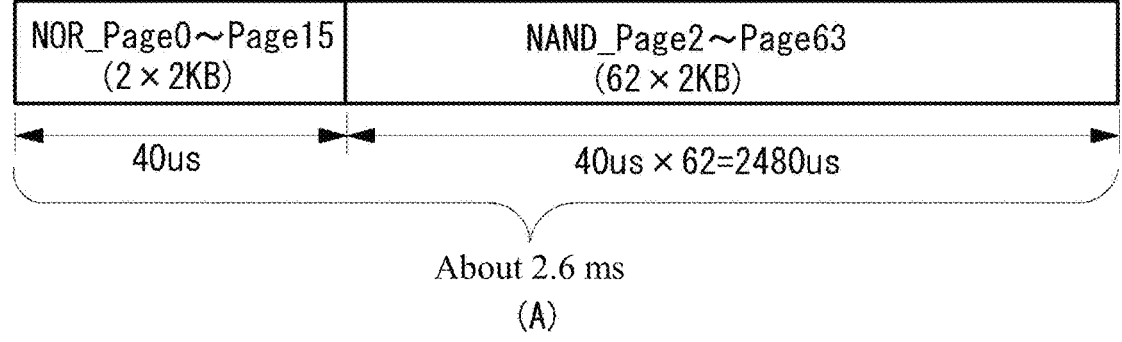
FIG. 7 is a diagram of a read out operation in the stacked type flash memory of the present embodiment.

(A) of FIG. 7 is a timing chart when data of page P0 to page P63 are continuously read out. (B) of FIG. 7 to (E) of FIG. 7 are diagrams illustrating the transition of operations of NOR type flash memory and NAND type flash memory.

When the controller 300 receives a NOR standard continuous read out command from the host device 30, the controller 300 controls the continuous read out of the NOR type flash memory 100 and the NAND type flash memory 200 according to the command. First, when the address received from the host device 30 or the address read out is predetermined, based on the predetermined address, the NOR type flash memory 100 sequentially and continuously reads out data of 16 pages of 4 K bytes from NOR_Page0 to NOR_Page15 from the NOR memory array 110. As described above, NOR_Page0 to NOR_Page15 correspond to the 4 K bytes of page P0 and page P1 of the NAND type flash memory.

The unit read out from the NOR type memory array 110 may be in units of bits, units of bytes, units of characters, or any other unit. The X-DEC 120 generates row addresses for reading out NOR_Page0 to NOR_Page15. Moreover, for example, the Y-DEC 150 automatically increments the address counter and generates column address 0 to column address 255 for reading out NOR_Page0. When the reading out of NOR_Page0 is ended, the address counter is reset again, and column address 0 to column address 255 for continuous reading out of NOR_Page1 are generated. The data read out from the NOR type memory array 110 may be temporarily stored in the buffer 140, or may be output to the input/output circuit 330 via the internal bus 400 without being stored in the buffer 140.

During the period when NOR_Page0 to NOR_Page15 are continuously read out from the NOR type flash memory 100, the NAND type flash memory 200 in the ready state selects page P2 of the NAND type memory array 210 via the X-DEC 220, and reads out page P2. After the data of page P2 is transferred to the cache register 240, the next page P3 is selected and page P3 is read out. This situation is shown in (B) of FIG. 7.

When the continuous reading out of NOR_Page0 to NOR_Page 15 via the NOR type flash memory 100 is ended, next, the reading out of page P2 to page P63 via the NAND type flash memory 200 is performed.

For example, when the clock signal based on SPI is 100 MHz and is synchronized with DTR for data readout, as shown in (A) of FIG. 7, the time needed to read out the 4 KB of NOR_Page0 to NOR_Page15 from the NOR type flash memory 100 is approximately 40 us. The readout time is approximately equal to or slightly greater than the array readout latency of the NAND type flash memory 200. Therefore, during the period when the NOR type flash memory 100 is continuously reading out NOR_Page0 to NOR_Page15, the NAND type flash memory 200 ends the array reading out of page P2, and the data of page P2 is set in the cache register 240 via the page buffer/SA 230.

Accordingly, immediately after the continuous reading out of 4 KB (2×2 KB) of NOR_Page0 to NOR_Page15 via the NOR type flash memory 100 is ended, page P2 is continuously read out from the NAND type flash memory 200. This situation is shown in (C) of FIG. 7. Thereafter, the NAND type flash memory sequentially reads out page P3 to page P63 continuously. This situation is shown in (D) of FIG. 7 and (E) of FIG. 7.

If the time needed to read out one page of the NAND type flash memory is set to 40 us, the time needed for the NAND type flash memory 200 to continuously read out 62 pages from P2 to P63 is 40 us×62=2480. As a result, the time needed to read out 64 pages continuously is 40 us+(40 us×62)≈2.6 ms.

The continuous readout based on the present embodiment actually offsets the array readout latency based on NAND type flash memory. Therefore, compared with the case where 64 pages of data are continuously read out from a single NAND type flash memory, high-speed readout may be achieved.

In the embodiment, an example in which a portion of the data loaded into the NOR type flash memory 100 from the external bus is programmed and the remaining data is programmed via the NAND type flash memory 200 is shown. For example, when the stacked type flash memory 10 is not used, or via behind-the-scenes processing, the data programmed in the NAND type flash memory 200 may also be copied to the NOR type flash memory 100. The NAND type flash memory 200 may retain a backup of the data written in the NOR type flash memory 100, thereby ensuring data that needs reliability such as boot data.

In the embodiment, an example of programming in the stacked type flash memory 10 is described. During readout, data may be read out from the individual NOR type flash memory 100 or NAND type flash memory 200 respectively. For example, as before, the boot data programmed into the NOR type flash memory 100 may be read out at high speed via SPI. The buffer 140 functions in a manner to pass or bypass data so as not to affect readout speed.

Figure 8:
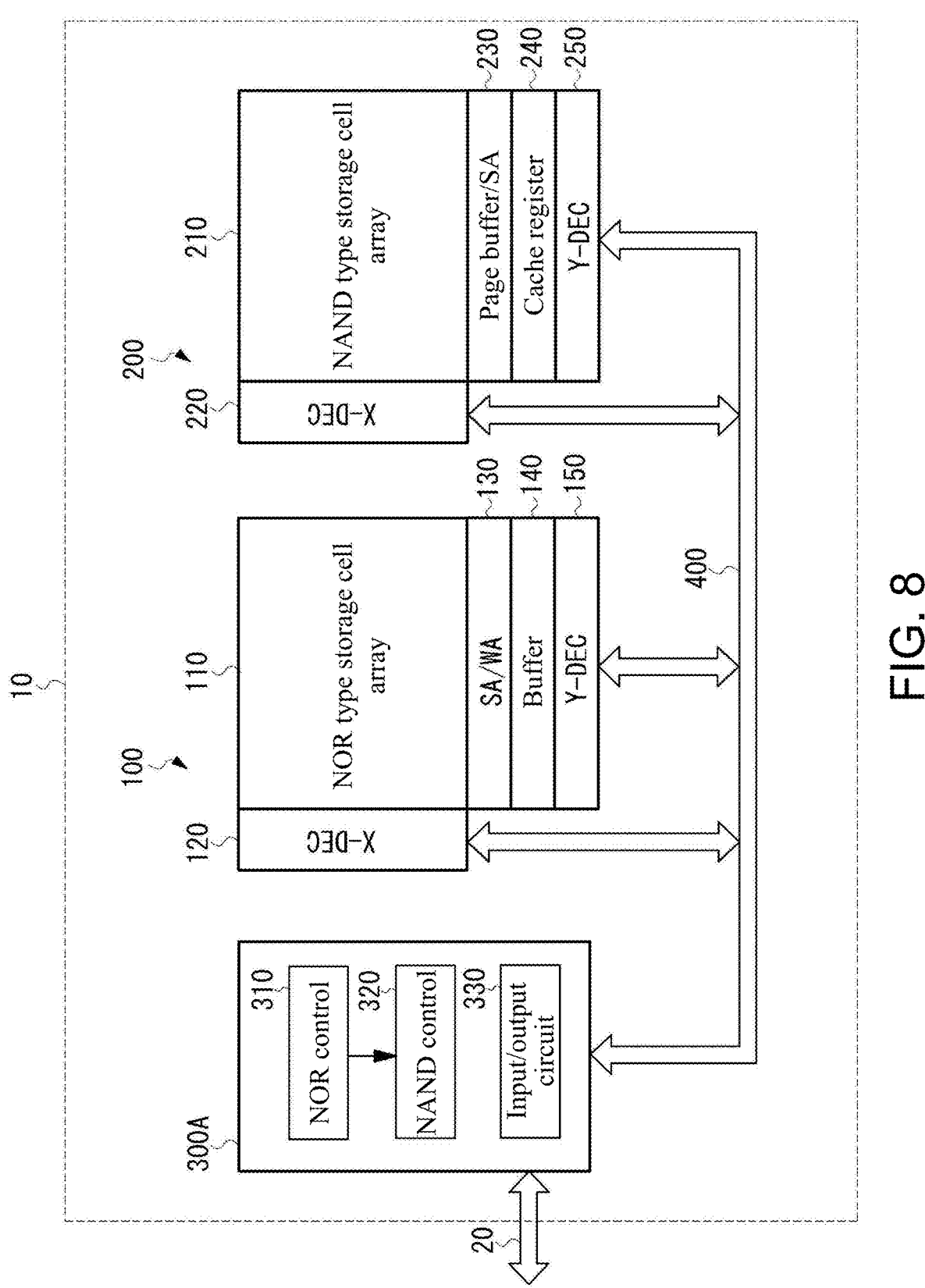
FIG. 8 and FIG. 9 are diagrams of other structural examples of the stacked type flash memory of an embodiment of the invention.

As shown in FIG. 3, the input/output circuit 330 is connected to the controller 300 via the internal bus 400, but is not limited thereto. As shown in FIG. 8, a controller 300A may include the input/output circuit 330, and the controller 300A may be connected to the external bus 20. In addition, as shown in FIG. 3, the NAND type flash memory 200 is configured to include the controller 260, but as shown in FIG. 8, the controller 300A may also directly control the NAND type flash memory 200 via the input/output circuit 330. The internal commands and the internal addresses generated by the NAND control 320 are provided to the NAND type flash memory 200 via the input/output circuit 330 and the internal bus 400.

Figure 9:
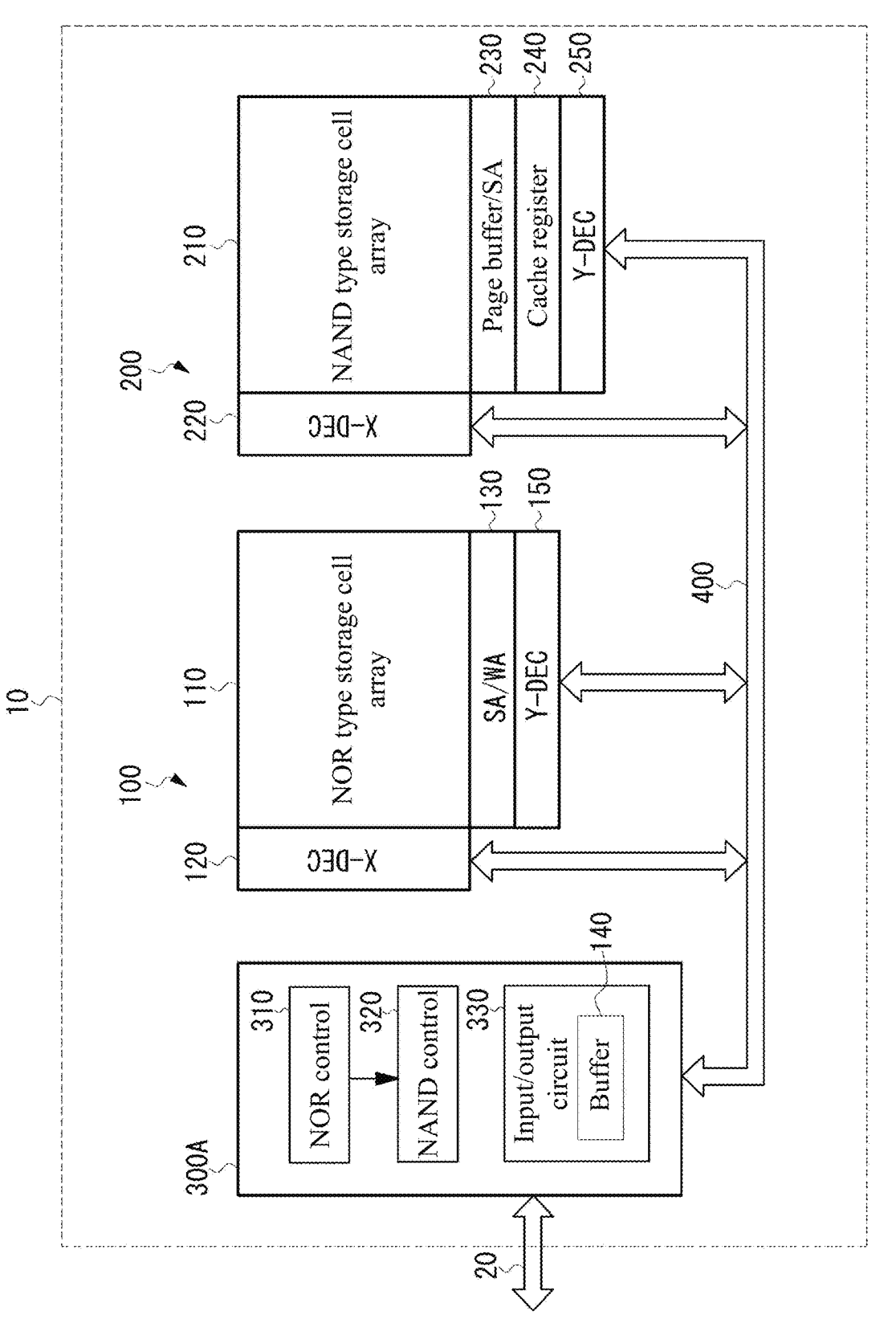

Furthermore, in the embodiment, the NOR type flash memory 100 is configured to include the buffer 140 holding programming data, but the buffer 140 may also be included in the input/output circuit 330 as shown in FIG. 9. The data read out from the NAND type flash memory 200 is held in the buffer 140 of the input/output circuit 330, and the data is provided from the input/output circuit 330 to the NOR type flash memory 100 via the internal bus 400. In addition, as shown in time t5 to time t6 of FIG. 6, since data needs to be loaded from the external bus 20 to the NAND type flash memory 200, the input/output circuit 330 provides the data retrieved from the external bus 20 to the NAND type flash memory 200 via the internal bus 400 without disturbing the buffer 140.

In the embodiment, although an example of programming boot code or firmware in a stacked type flash memory is shown, this is an example, and the size or the type of data to be programmed is not particularly limited. The storage capacity of the NOR type flash memory 100 or the NAND type flash memory 200 may be appropriately selected according to the data to be programmed or the usage environment. Moreover, the data size of one page of the NOR type flash memory 100 or the data size of one page of the NAND type flash memory 200 shown in the embodiment is an example. These data sizes may be appropriately changed according to the operational design of the stacked type flash memory.

Preferred embodiments of the invention are described in detail. However, the invention is not limited to the specific embodiments, and various modifications and changes are possible within the scope of the spirit of the invention described in the claims.

11

What is claimed is:

1. A semiconductor device, comprising:

an input/output circuit;

a NOR type flash memory and a NAND type flash memory connected to the input/output circuit via an internal bus; and a controller controlling an operation of the NOR type flash memory and the NAND type flash memory based on a command received from the input/output circuit, wherein the controller reads out data programmed into the NAND type flash memory and programs the read out data into the NOR type flash memory, wherein when a unit of one page of the NOR type flash memory is M bytes and a unit of one page of the NAND type flash memory is M×k, after a programming of an opening page of the NOR type flash memory is ended, the controller programs the opening page of the NOR type flash memory based on the data read out from the NAND type flash memory, wherein M and k are positive integers.

2. The semiconductor device of claim 1, wherein the controller programs data received from the input/output circuit into both the NOR type flash memory and the NAND type flash memory.

3. The semiconductor device of claim 1, wherein the controller programs data received from the input/output circuit into the NAND type flash memory during a period of programming into the NOR type flash memory.

4. The semiconductor device of claim 1, wherein data is continuously programmed into the NOR type flash memory according to a continuous programming command.

5. The semiconductor device of claim 1, wherein after reading out a first page of the NOR type flash memory according to a continuous read out command, the controller reads out a continuous second page following the first page from the NAND type flash memory.

6. The semiconductor device of claim 5, wherein an array of the second page is read out during a period of outputting read out data of the first page.

7. The semiconductor device of claim 1, wherein the controller receives a command for the NOR type flash memory from the input/output circuit and generates a command for the NAND type flash memory according to the command.

8. The semiconductor device of claim 1, wherein the controller receives an address toward the NOR type flash memory from the input/output circuit, and generates an address toward the NAND type flash memory according to the address.

9. The semiconductor device of claim 1, wherein a chip on which the NOR type flash memory is formed and a chip on which the NAND type flash memory is formed are laminated.

10. An operating method of a semiconductor device, wherein the semiconductor device comprises a NOR type flash memory and a NAND type flash memory, a controller of the NOR type flash memory controls an operation of the NOR type flash memory and the NAND type flash memory based on a command received via an input/output circuit, wherein the controller reads out data programmed into the NAND type flash memory and programs the read out data into the NOR type flash memory, wherein when a unit of one page of the NOR type flash memory is M bytes and a unit of one page of the NAND type flash memory is M×k, after a programming of an opening page of the NOR type flash memory is ended, the controller programs the opening page of the NOR type flash memory based on the data read out from the NAND type flash memory, wherein M and k are positive integers.

11. The operating method of claim 10, wherein the controller programs data received from the input/output circuit into both the NOR type flash memory and the NAND type flash memory.

12. The operating method of claim 10, wherein the controller programs data received from the input/output circuit into the NAND type flash memory during a period of programming into the NOR type flash memory.

13. The operating method of claim 10, wherein after programming data received from the input/output circuit into the NAND type flash memory, the controller reads out data from the NAND type flash memory and provides the read out data to the NOR type flash memory.

14. The operating method of claim 10, wherein the controller continuously programs data into the NOR type flash memory according to a continuous programming command.

15. The operating method of claim 10, wherein when programming a subsequent page of the NOR type flash memory, the controller selectively reads out data corresponding to the subsequent page from data read out from a selected page of the NAND type flash memory.

16. The operating method of claim 15, wherein the controller loads data programmed from the input/output circuit to a next page of the NAND type flash memory during a period of programming the subsequent page.

17. The operating method of claim 10, wherein after reading out a first page of the NOR type flash memory according to a continuous read out command, the controller reads out a continuous second page following the first page from the NAND type flash memory.

* * * * *